United States Patent
Sayenko et al.

(10) Patent No.: US 10,819,476 B2
(45) Date of Patent: Oct. 27, 2020

(54) MULTICARRIER HSUPA COMMUNICATION APPARATUS AND METHOD

(71) Applicant: Nokia Solutions and Networks Oy, Espoo (FI)

(72) Inventors: Alexander Sayenko, Espoo (FI); Karri Markus Ranta-Aho, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/752,357

(22) PCT Filed: Aug. 13, 2015

(86) PCT No.: PCT/EP2015/068692
§ 371 (c)(1),
(2) Date: Feb. 13, 2018

(87) PCT Pub. No.: WO2017/025150
PCT Pub. Date: Feb. 16, 2017

(65) Prior Publication Data
US 2019/0007177 A1    Jan. 3, 2019

(51) Int. Cl.
*H04L 5/00*   (2006.01)
*H04W 76/16*   (2018.01)
*H04J 13/18*   (2011.01)

(52) U.S. Cl.
CPC ............ *H04L 5/001* (2013.01); *H04J 13/18* (2013.01); *H04L 5/0044* (2013.01); *H04W 76/16* (2018.02); *H04L 5/0016* (2013.01)

(58) Field of Classification Search
None
See application file for complete search history.

(56) References Cited

U.S. PATENT DOCUMENTS

| 2006/0176867 | A1* | 8/2006 | Kwak ................. H04W 52/34 370/342 |
| 2008/0144547 | A1 | 6/2008 | Kwon et al. ................. 370/310 |
| 2009/0196251 | A1 | 8/2009 | Choi-Grogan et al. ...... 370/331 |
| 2010/0278341 | A1* | 11/2010 | Kubota ................. H04W 12/02 380/257 |
| 2014/0307644 | A1 | 10/2014 | Kwong et al. ................ 370/329 |

FOREIGN PATENT DOCUMENTS

WO    WO 2013171341 A1    11/2013

* cited by examiner

*Primary Examiner* — Alex Skripnikov
(74) *Attorney, Agent, or Firm* — Harrington & Smith

(57) ABSTRACT

There is provided a method including determining, at a user equipment capable of providing uplink packet switched data using at least a first high speed packet access carrier, the presence of a request for a dedicated channel carrying circuit switched data and allocating at least one code from the first high speed packet access carrier for use by the dedicated channel, such that the user equipment is capable of providing uplink packet switched data using the first high speed packet access carrier while the dedicated channel is ongoing.

25 Claims, 6 Drawing Sheets

420 — Determining, at a user equipment capable of providing uplink packet switched data using at least a first high speed packet access carrier, the presence of a request for a dedicated channel carrying circuit switched data 440 — Allocating at least one code from the first high speed packet access carrier for use by the dedicated channel, such that the user equipment is capable of providing uplink packet switched data using the first high speed packet access carrier while the dedicated channel is ongoing

MULTICARRIER HSUPA COMMUNICATION APPARATUS AND METHOD

FIELD

The present application relates to a method, apparatus and system and in particular but not exclusively to multi-carrier high speed packet access (HSPA) communications.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A mobile communication network may logically be divided into a radio access network (RAN) and a core network (CN). The core network entities typically include various control or management entities, and gateways for enabling communication via a number of radio access networks and also for interfacing a single communication system with one or more communication systems, such as with other wireless systems, such as a wireless Internet Protocol (IP) network, and/or fixed line communication systems, such as a public switched telephone network (PSTN). Examples of radio access networks may comprise the UMTS terrestrial radio access network (UTRAN), the GSM/EDGE radio access network (GERAN) and the evolved UMTS terrestrial radio access network (EUTRAN). High speed packet access (HSPA) of UTRAN comprises the high speed downlink packet access protocol and the high speed uplink packet protocol which uses wideband code division multiple access WCDMA protocols.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity are the architectures that are known as the HSPA and long-term evolution (LTE) of the Universal Mobile Telecommunications System (UMTS) radio-access technology. The HSPA and LTE is being standardized by the 3rd Generation Partnership Project (3GPP). The various development stages of the 3GPP HSPA and LTE specifications are referred to as releases.

SUMMARY OF THE INVENTION

In a first aspect there is provided a method comprising determining, at a user equipment capable of providing uplink packet switched data using at least a first high speed packet access carrier, the presence of a request for a dedicated channel carrying circuit switched data and allocating at least one code from the first high speed packet access carrier for use by the dedicated channel, such that the user equipment is capable of providing uplink packet switched data using the first high speed packet access carrier while the dedicated channel is ongoing.

Allocating a code from the first high speed access carrier may comprise reducing the capacity of the carrier for uplink packet switched data from a full code set to a reduced code set.

The full code set may be 2×SF2+2×SF4.

The reduced code set may be 2×SF2.

The user equipment may be capable of providing uplink packet switched data using the first high speed packet access carrier and at least one second high speed packet access carrier. The method may comprise allocating at least one code from the first high speed packet access carrier for use by the dedicated channel, such that the user equipment is capable of providing uplink packet switched data using the second high speed packet access carrier while the dedicated channel carrying circuit switched data is ongoing.

The user equipment may be capable of providing uplink packet switched data using the second high speed access carrier at a capacity of the full code set while the dedicated channel is ongoing.

The first high speed access carrier may be a primary carrier. The second high speed access carrier may be a secondary carrier.

Determining the presence of a request for a dedicated channel carrying circuit switched data may comprise: at least one of receiving an incoming circuit switched call and initiating a circuit switched call and the method may comprise allocating the at least one code for use by the dedicated channel statically when the request is determined.

Determining the presence of a request for a dedicated channel carrying circuit switched data may comprise determining whether circuit switched data on the dedicated channel is present and, if so, allocating dynamically the at least one code for use by the dedicated channel.

The at least one code may be allocated for the dedicated channel from a code tree associated with the user equipment.

The dedicated channel for carrying circuit switched data may be a dedicated physical data channel.

In a second aspect there is provided a method comprising receiving, from a user equipment, uplink packet switched data using a first high speed packet access carrier while a dedicated channel for carrying circuit switched data is ongoing, the dedicated channel using at least one code allocated from the first high speed packet access carrier.

The capacity of the first high speed access carrier for uplink packet switched data may be reduced from a full code set to a reduced code set.

The full code set may be 2×SF2+2×SF4.

The reduced code set may be 2×SF2.

The user equipment may be capable of providing uplink packet switched data using at least a first high speed packet access carrier and a second high speed packet access carrier. The method may comprise receiving uplink packet switched data using the second high speed packet access carrier while the dedicated channel for carrying circuit switched data is ongoing.

The capacity of the second high speed access carrier may be at a full code set while the dedicated channel is ongoing.

The first high speed access carrier may be a primary carrier. The second high speed access carrier may be a secondary carrier.

The at least one code for use by the dedicated channel may be allocated statically.

The at least one code may be allocated for use by the dedicated channel if circuit switched data on the dedicated channel is present.

The at least one code may be allocated for use by the dedicated channel from a code tree associated with the user equipment.

The dedicated channel for carrying circuit switched data may be a dedicated physical data channel.

In a third aspect, there is provided an apparatus, said apparatus comprising means for determining, at a user equipment capable of providing uplink packet switched data using at least a first high speed packet access carrier, the presence of a request for a dedicated channel carrying circuit switched data and means for allocating at least one code from the first high speed packet access carrier for use by the dedicated channel, such that the user equipment is capable of providing uplink packet switched data using the first high speed packet access carrier while the dedicated channel is ongoing.

Means for allocating a code from the first high speed access carrier may comprise means for reducing the capacity of the carrier for uplink packet switched data from a full code set to a reduced code set.

The full code set may be 2×SF2+2×SF4.

The reduced code set may be 2×SF2.

The user equipment may be capable of providing uplink packet switched data using the first high speed packet access carrier and at least one second high speed packet access carrier. The apparatus may comprise means for allocating at least one code from the first high speed packet access carrier for use by the dedicated channel, such that the user equipment is capable of providing uplink packet switched data using the second high speed packet access carrier while the dedicated channel carrying circuit switched data is ongoing.

The user equipment may be capable of providing uplink packet switched data using the second high speed access carrier at a capacity of the full code set while the dedicated channel is ongoing.

The first high speed access carrier may be a primary carrier. The second high speed access carrier may be a secondary carrier.

Means for determining the presence of a request for a dedicated channel carrying circuit switched data may comprise at least one of means for receiving an incoming circuit switched call and means for initiating a circuit switched call and the apparatus may comprise means for allocating the at least one code for use by the dedicated channel statically when the request is determined.

Means for determining the presence of a request for a dedicated channel carrying circuit switched data may comprise means for determining whether circuit switched data on the dedicated channel is present and means for, if so, allocating dynamically the at least one code for use by the dedicated channel.

The at least one code may be allocated for the dedicated channel from a code tree associated with the user equipment.

The dedicated channel for carrying circuit switched data may be a dedicated physical data channel.

In a fourth aspect there is provided an apparatus, said apparatus comprising means for receiving, from a user equipment, uplink packet switched data using a first high speed packet access carrier while a dedicated channel for carrying circuit switched data is ongoing, the dedicated channel using at least one code allocated from the first high speed packet access carrier.

The capacity of the first high speed access carrier for uplink packet switched data may be reduced from a full code set to a reduced code set.

The full code set may be 2×SF2+2×SF4.

The reduced code set may be 2×SF2.

The user equipment may be capable of providing uplink packet switched data using at least a first high speed packet access carrier and a second high speed packet access carrier. The apparatus may comprise means for receiving uplink packet switched data using the second high speed packet access carrier while the dedicated channel for carrying circuit switched data is ongoing.

The capacity of the second high speed access carrier may be at a full code set while the dedicated channel is ongoing.

The first high speed access carrier may be a primary carrier. The second high speed access carrier may be a secondary carrier.

The at least one code for use by the dedicated channel may be allocated statically.

The at least one code may be allocated for use by the dedicated channel if circuit switched data on the dedicated channel is present.

The at least one code may be allocated for use by the dedicated channel from a code tree associated with the user equipment.

The dedicated channel for carrying circuit switched data may be a dedicated physical data channel.

In a fifth aspect there is provided an apparatus, said apparatus comprising at least one processor and at least one memory including a computer program code, the at least one memory and the computer program code configured to, with the at least one processor, cause the apparatus at least to determine, at a user equipment capable of providing uplink packet switched data using at least a first high speed packet access carrier, the presence of a request for a dedicated channel carrying circuit switched data and allocate at least one code from the first high speed packet access carrier for use by the dedicated channel, such that the user equipment is capable of providing uplink packet switched data using the first high speed packet access carrier while the dedicated channel is ongoing.

The apparatus may be configured to reduce the capacity of the carrier for uplink packet switched data from a full code set to a reduced code set.

The full code set may be 2×SF2+2×SF4.

The reduced code set may be 2×SF2.

The user equipment may be capable of providing uplink packet switched data using the first high speed packet access carrier and at least one second high speed packet access carrier. The apparatus may be configured to allocate at least one code from the first high speed packet access carrier for use by the dedicated channel, such that the user equipment is capable of providing uplink packet switched data using the second high speed packet access carrier while the dedicated channel carrying circuit switched data is ongoing.

The user equipment may be capable of providing uplink packet switched data using the second high speed access carrier at a capacity of the full code set while the dedicated channel is ongoing.

The first high speed access carrier may be a primary carrier. The second high speed access carrier may be a secondary carrier.

The apparatus may be configured to, at least one of, receive an incoming circuit switched call and initiate a circuit switched call and, if so, allocate the at least one code for use by the dedicated channel statically.

The apparatus may be configured to determine whether circuit switched data on the dedicated channel is present and, if so, allocate dynamically the at least one code for use by the dedicated channel.

The at least one code may be allocated for the dedicated channel from a code tree associated with the user equipment.

The dedicated channel for carrying circuit switched data may be a dedicated physical data channel.

In a sixth aspect there is provided an apparatus, said apparatus comprising at least one processor and at least one memory including a computer program code, the at least one memory and the computer program code configured to, with the at least one processor, cause the apparatus at least to receive, from a user equipment, uplink packet switched data using a first high speed packet access carrier while a dedicated channel for carrying circuit switched data is ongoing, the dedicated channel using at least one code allocated from the first high speed packet access carrier.

The capacity of the first high speed access carrier for uplink packet switched data may be reduced from a full code set to a reduced code set.

The full code set may be 2×SF2+2×SF4.

The reduced code set may be 2×SF2.

The user equipment may be capable of providing uplink packet switched data using at least a first high speed packet access carrier and a second high speed packet access carrier. The apparatus may be configured to receive uplink packet switched data using the second high speed packet access carrier while the dedicated channel for carrying circuit switched data is ongoing.

The capacity of the second high speed access carrier may be at a full code set while the dedicated channel is ongoing.

The first high speed access carrier may be a primary carrier. The second high speed access carrier may be a secondary carrier.

The at least one code for use by the dedicated channel may be allocated statically.

The at least one code may be allocated for use by the dedicated channel if circuit switched data on the dedicated channel is present.

The at least one code may be allocated for use by the dedicated channel from a code tree associated with the user equipment.

The dedicated channel for carrying circuit switched data may be a dedicated physical data channel.

In a seventh aspect there is provided a computer program embodied on a non-transitory computer-readable storage medium, the computer program comprising program code for controlling a process to execute a process, the process comprising determining, at a user equipment capable of providing uplink packet switched data using at least a first high speed packet access carrier, the presence of a request for a dedicated channel carrying circuit switched data and allocating at least one code from the first high speed packet access carrier for use by the dedicated channel, such that the user equipment is capable of providing uplink packet switched data using the first high speed packet access carrier while the dedicated channel is ongoing.

Allocating a code from the first high speed access carrier may comprise reducing the capacity of the carrier for uplink packet switched data from a full code set to a reduced code set.

The full code set may be 2×SF2+2×SF4.

The reduced code set may be 2×SF2.

The user equipment may be capable of providing uplink packet switched data using the first high speed packet access carrier and at least one second high speed packet access carrier. The process may comprise allocating at least one code from the first high speed packet access carrier for use by the dedicated channel, such that the user equipment is capable of providing uplink packet switched data using the second high speed packet access carrier while the dedicated channel carrying circuit switched data is ongoing.

The user equipment may be capable of providing uplink packet switched data using the second high speed access carrier at a capacity of the full code set while the dedicated channel is ongoing.

The first high speed access carrier may be a primary carrier. The second high speed access carrier may be a secondary carrier.

Determining the presence of a request for a dedicated channel carrying circuit switched data may comprise: at least one of receiving an incoming circuit switched call and initiating a circuit switched call and the method may comprise allocating the at least one code for use by the dedicated channel statically when the request is determined.

Determining the presence of a request for a dedicated channel carrying circuit switched data may comprise determining whether circuit switched data on the dedicated channel is present and, if so, allocating dynamically the at least one code for use by the dedicated channel.

The at least one code may be allocated for the dedicated channel from a code tree associated with the user equipment.

The dedicated channel for carrying circuit switched data may be a dedicated physical data channel.

In an eighth aspect there is provided a computer program embodied on a non-transitory computer-readable storage medium, the computer program comprising program code for controlling a process to execute a process, the process comprising receiving, from a user equipment, uplink packet switched data using a first high speed packet access carrier while a dedicated channel for carrying circuit switched data is ongoing, the dedicated channel using at least one code allocated from the first high speed packet access carrier.

The capacity of the first high speed access carrier for uplink packet switched data may be reduced from a full code set to a reduced code set.

The full code set may be 2×SF2+2×SF4.

The reduced code set may be 2×SF2.

The user equipment may be capable of providing uplink packet switched data using at least a first high speed packet access carrier and a second high speed packet access carrier. The process may comprise receiving uplink packet switched data using the second high speed packet access carrier while the dedicated channel for carrying circuit switched data is ongoing.

The capacity of the second high speed access carrier may be at a full code set while the dedicated channel is ongoing.

The first high speed access carrier may be a primary carrier. The second high speed access carrier may be a secondary carrier.

The at least one code for use by the dedicated channel may be allocated statically.

The at least one code may be allocated for use by the dedicated channel if circuit switched data on the dedicated channel is present.

The at least one code may be allocated for use by the dedicated channel from a code tree associated with the user equipment.

The dedicated channel for carrying circuit switched data may be a dedicated physical data channel.

In a ninth aspect there is provided a computer program product for a computer, comprising software code portions for performing the steps the method of the first aspect when said product is run on the computer.

In the above, many different embodiments have been described. It should be appreciated that further embodiments may be provided by the combination of any two or more of the embodiments described above.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
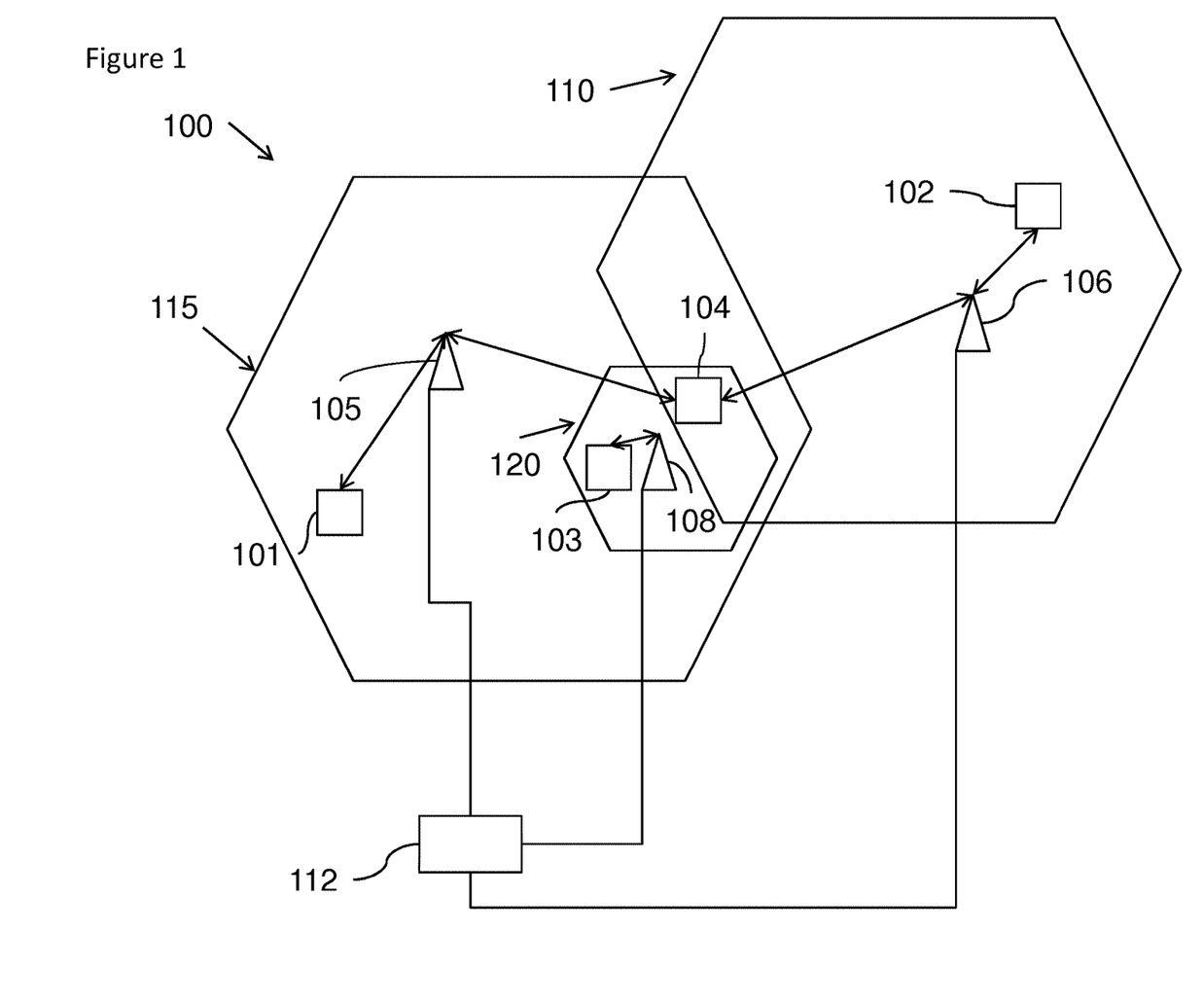
FIG. 1 shows a schematic diagram of an example communication system comprising a base station and a plurality of communication devices.

In a wireless communication system 100, such as that shown in FIG. 1, mobile communication devices or user equipment (UE) 101, 102, 103, 104 are provided wireless access via at least one base station or similar wireless transmitting and/or receiving node or point. In FIG. 1 three neighbouring and overlapping access systems, cells or radio service areas 115, 110 and 120 are shown being provided by base stations 105, 106, and 108.

However, it is noted that instead of three access systems, any number of access systems can be provided in a communication system. An access system can be provided by a cell of a cellular system or another system enabling a communication device to access a communication system. A base station site 105, 106, 108 can provide one or more cells. A base station can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. Each mobile communication device 101, 102, 103, 104, and base station 105, 106, and 108 may have one or more radio channels open at the same time and may send signals to and/or receive signals from more than one source.

Base stations are typically controlled by at least one appropriate controller apparatus, so as to enable operation thereof and management of mobile communication devices in communication with the base stations. The controller apparatus may be located in a radio access network (RAN) (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller (RNC). Base stations 105, 106, 108 may be controlled by a RNC 112 so as to enable operation thereof and management of mobile communication devices 101, 102, 103, 104 in communication with the base stations 105, 106, 108. The function of the RNC may be distributed between a plurality of entities. Although not shown in FIG. 1 in some embodiments, each base station 105, 106 and 108 can have at least part of the RNC function.

The cell borders or edges are schematically shown for illustration purposes only in FIG. 1. It shall be understood that the sizes and shapes of the cells or other radio service areas may vary considerably from the similarly sized omnidirectional shapes of FIG. 1.

In particular, FIG. 1 depicts two wide area base stations 105, 106, which can be macro-NBs (node B) 105, 106. The macro-NBs 105, 106 transmit and receive data over the entire coverage of the cells 115 and 110 respectively. FIG. 1 also shows a smaller base station or access point 108. The coverage of the smaller base station 108 may generally be smaller than the coverage of the wide area base stations 105, 106. The coverage provided by the smaller node 108 overlap with the coverage provided by the macro-NBs 105, 106. In some embodiments, the smaller node can be pico NB or a femto NB. A femto node B may be connected to a Home NodeB Gateway which in turn is connected to RNC. In some embodiments, the smaller stations may not be provided.

Figure 2:
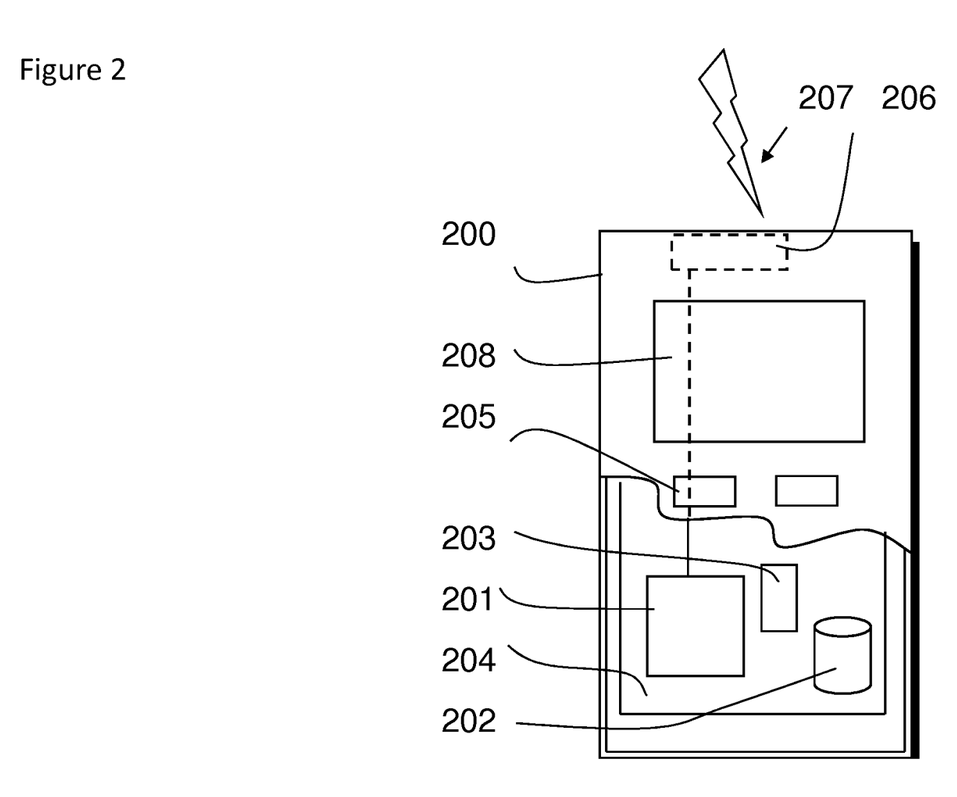
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). High Speed Packet Access (HSPA), which includes High Speed Downlink Packet Access (HSPDA) and High Speed Packet Uplink Access (HSUPA), may be used to increase performance in WCDMA networks. Other non-limiting examples of access techniques comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A) or high-speed packet access (HSPA) for uplink and downlink. The HSPA employs a mobile architecture known as the Universal Terrestrial Radio Access Network (UTRAN). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell or similar radio service area.

HSPA technology has a number of UL and DL enhancements, e.g. multi-carrier operation. In addition to DL multi-carrier operation, dual-carrier UL operation (hereafter referred to as DC-HSUPA), limited to two adjacent carriers, was introduced in Rel-9. Dual-carrier UL operation for two different bands (similarly to existing DL dual-band operation) is being considered in Rel-13.

DC-HSUPA has been shown to achieve 11.5 Mbps with QPSK and 23 Mbps with 16 QAM in the UL direction. There may be an interest to improve UL performance due to the fact that more and more data is being sent in the UL direction.

In addition to the multi-carrier enhancements in DL and UL, HSPA technology continues to offer support for the basic R99 voice calls (hereafter referred to as circuit switched (CS) calls). Some LTE operators may not deploy voice over LTE, but rather use a CS fallback feature that moves a terminal to HSPA when a CS call needs to be established.

Thus, the HSPA technology still remains an interesting option for operators to provide high data rates and continues to offer the basic voice service. As a result it may be important to ensure that both multi-carrier and CS functions do not mutually exclude each other.

The RNC may configure simultaneously DL multi-carrier and CS calls. However, in the current HSPA system it is not possible to configure simultaneously DC-HSUPA with the CS call. This limitation comes from a DC-HSUPA feature aimed at achieving the maximum UL rate, whereupon all the UL codes are used, thus leaving no room for the DPDCH channel needed for the CS call data.

Figure 3:
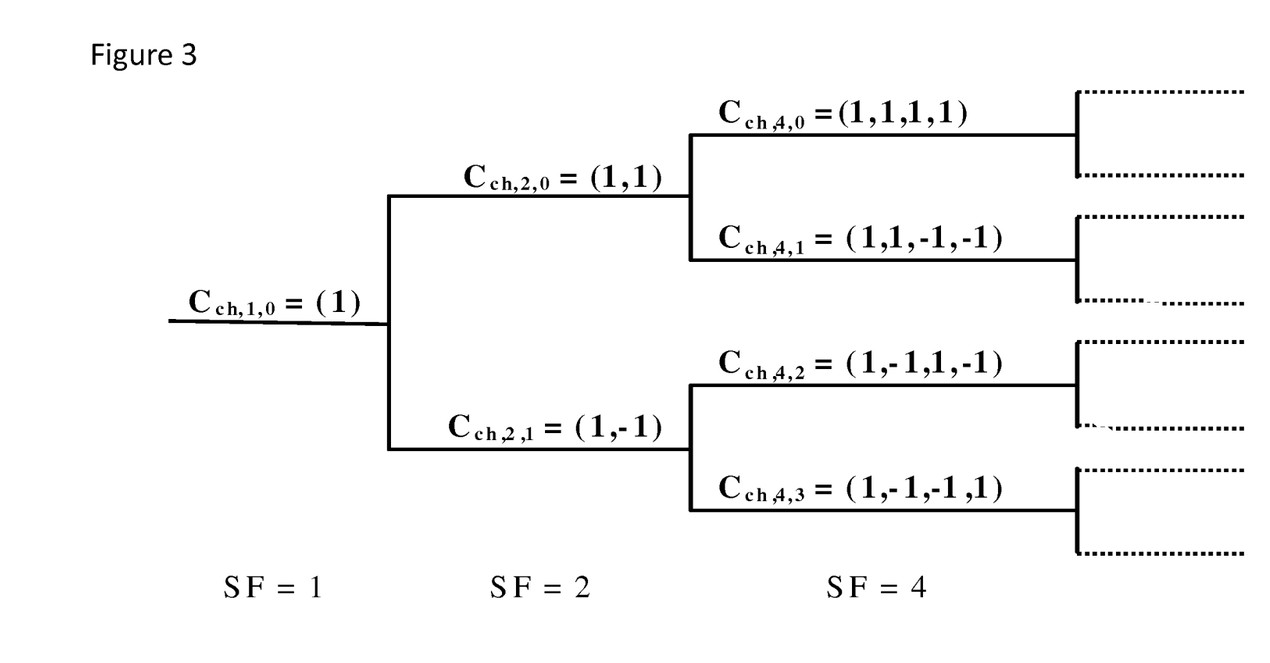
FIG. 3 shows an example code tree.

FIG. 3 shows an example CDMA code tree. In WCDMA system, the UL code tree has two code trees per carrier, one for I-branch and one for Q-branch of the complex radio signal. If spreading factor (SF)2 is used there are two parallel SF2 code channels to transmit two parallel streams of data that don't interfere with each other, but each one of the two parallel streams has half the rate compared to a data stream using a SF1 code channel. 3GPP TS 25.213 v12.0.0 section 4.3.1 describes in more detail how the CDMA code tree can be applied to a WCDMA system.

The DL code tree is cell specific whereas the UL code tree is UE specific, and one code tree exist in each UL carrier. In UL the maximum code set is semi-statically allocated, and the code usage is derived from the transport block size (data rate). In DL code allocation, there is no need to semi-statically allocate the maximum HS-PDSCH code set, the used codes are indicated every transmission timer interval (TTI) on the high speed signaling control channel (HS-SCCH). In UL, the DC-HSUPA can only be allocated when maximum code set 2×SF2+2×SF4 is set aside for DC-HSUPA (even if not used for a given time), and this prevents using CS voice over DCH in uplink when DC-HSUPA is allocated. As a result, when a UE initiates an outgoing, or receives an indication for an incoming CS call, the RNC must reconfigure a UE from UL dual-carrier to single-carrier operation. Once DCH is configured, the UL E-DPDCH code configuration is limited to 2×SF2. A CS call on a dedicated DCH operates on a "single carrier" and is always mapped on the primary carrier when multicarrier operation is configured for the packet data traffic. Dedicated DCH is never split or duplicated over multiple carriers.

Thus, it may be desirable however to avoid de-activation of the DC-HSUPA feature. Even if a peak UL rate would not be achieved, the DC-HSUPA would still allow scheduling of data at both UL carriers which may achieve load-balancing compared to when only one carrier is configured.

The same issue may exist also for UL MIMO, UL 16 QAM and UL 64 QAM, which may be configured with full uplink code configuration allocated for E-DPDCH only and thus leave no space for a code carrying DPDCH. Current HSPA specification prohibits a RNC from configuring simultaneously UL MIMO, UL 16 QAM as well as UL 64 QAM together with a CS call mapped on DPDCH, eventually forcing RNC to de-activate these high-data rate features in order to allow for the CS call to proceed.

Figure 4:
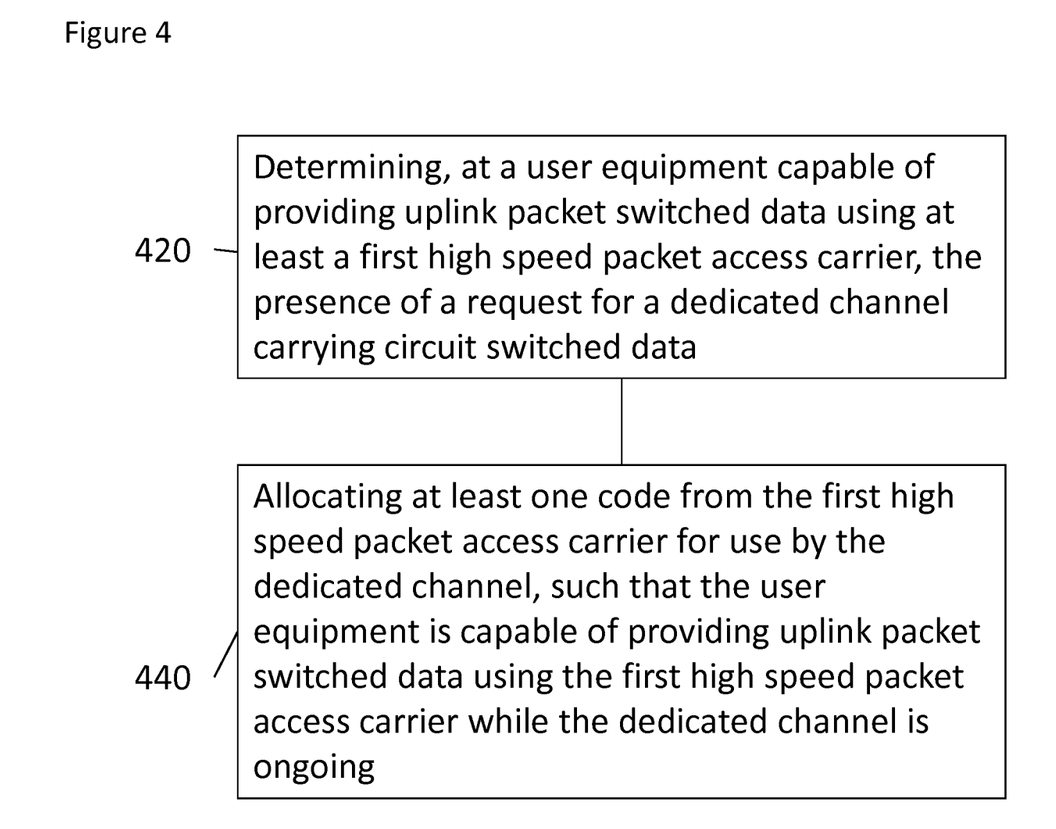
FIG. 4 shows a flowchart of an example method for initiating a simultaneous CS call with a data call.

FIG. 4 shows a method comprising, in step 420, determining, at a user equipment capable of providing uplink packet switched data using at least a first high speed packet access carrier, the presence of a request for a dedicated channel carrying circuit switched data.

In step 440 the method comprises allocating at least one code from the first high speed packet access carrier for use by the dedicated channel, such that the user equipment is capable of providing uplink packet switched data using the first high speed packet access carrier while the dedicated channel is ongoing.

An example method may comprise receiving, from a user equipment, uplink packet switched data using a first high speed packet access carrier while a dedicated channel for carrying circuit switched data is ongoing, the dedicated channel using at least one code allocated from the first high speed packet access carrier. The method may be performed at a base station, e.g. a NB, or a RNC. A Node B receives the CS and PS data on the uplink dedicated physical code channels. The RNC receives the CS and PS data from the Node B, but logically it still receives the dedicated channels (but not physical code channels)

The user equipment may be capable of providing uplink packet switched data using the first high speed packet access carrier and at least one second high speed packet access carrier. The method may comprise allocating at least one code from the first high speed packet access carrier for use by the dedicated channel, such that the user equipment is capable of providing uplink packet switched data using the second high speed packet access carrier while the dedicated channel carrying circuit switched data is ongoing. More specifically the first high speed packet access carrier has a reduced capacity compared to the second high speed packet access carrier in order to make room for the dedicated channel. The second high speed access carrier may have capacity of the full code set, e.g. 2×SF2+2×SF4, while the dedicated channel is ongoing.

The first high speed access carrier may be a primary carrier. The second high speed access carrier may be a secondary carrier. The user equipment may operate in dual carrier mode using the primary carrier and the second carrier. The user equipment may operate in multi carrier mode when there is a plurality of secondary carriers. The circuit switched data carried on the dedicated channel may be a R99 voice call (referred to hereafter as a CS call, R99=version of 3GPP UTRAN specifications for release 1999). The first dedicated channel may be a dedicated physical data channel (DPDCH). The uplink data may be carried on an enhanced dedicated physical data channel (E-DPDCH)

The at least one code may be allocated for the dedicated channel from a code tree associated with the user equipment.

The uplink code tree is a property of the WCDMA uplink physical layer. The allocation of codes to different data may be specified by the physical layer, following rules configured by the higher layers (by the RNC). In case of no DCH, up to two SF2+two SF4 codes may be mapped for E-DCH. If DCH for CS voice is present at least one SF4 code branch is allocated for the DCH from E-DCH. For simplicity, the code is reduced to 2×SF2 for E-DCH rather than e.g. 2×SF2+1×SF4 when DCH is simultaneously configured.

A method such as that of FIG. 4 allows a UE to perform a "code fallback" for those cases when the CS call is configured with UL peak rate features (such as UL DC-HSUPA and UL MIMO), which without the CS call, occupy all the UL codes. Whenever the CS call is configured, a UE borrows the required codes for the DPDCH channel to enable simultaneous operation of CS with e.g. DC-HSUPA. To enable the CS call, a UE may borrow some codes from a primary carrier to enable the DPDCH channel carrying CS data. There is no effect on a secondary UL carrier, since the UL DPDCH carrying the CS voice packets is only present in the primary carrier.

The first dedicated channel may be provided on the first carrier. For example, the DPDCH channel may be limited only to the primary carrier in the DL direction.

Allocating a code from one of the first carrier may comprise reducing the capacity of the respective carrier from a full code set to a reduced code set, e.g. from 2×SF2+2×SF4 to 2×SF2.

In an embodiment, "2×SF2" on the primary carrier is adopted as the maximum allowed and "2×SF2+2×SF4" on the secondary carrier (while the CS call is ongoing). "2×SF2" with DPDCH is an existing combination thus not requiring any other modifications at the UE side. It should be noted that the maximum achievable throughput from two UL carriers would be around 9.6 Mbps with QPSK and 15.35 Mbps with 16 QAM.

Thus there is no need to reconfigure the UE away from the data features, and especially in the case of DC-HSUPA, the secondary carrier's additional capacity (2×SF2+2×SF4 with 16 QAM or 64 QAM if configured) is still at the UE's disposal while the primary carrier's data rate is limited to what the 2×SF2 with QPSK while voice call is carried out.

The at least one code for the dedicated channel may be allocated statically, i.e. regardless of transmission on the dedicated channel. For example, on an embodiment, whenever a UE is configured with DC-HSUPA and needs to establish a call (or the incoming call arrives), a UE will reserve codes for the DPDCH channel from the primary carrier statically regardless of the actual voice activity. It may be simpler for a UE but it may be a less efficient UL resources when there is nothing to send over DPDCH e.g. during speech silence periods.

Alternatively, or in addition, the method may comprise determining whether a transmission, i.e. CS data, on the dedicated channel is present and, if so, allocating the at least one code for use by the dedicated channel. When CS data is not present on the dedicated channel, the full code configuration may be used for the uplink packet switched data transmission. This may referred to as a dynamic approach.

In an embodiment, the uplink E-DPDCH transmissions may be limited to 2×SF2 or below if there is an active transmission on the UL DPDCH (the transport format combination (TFC) selection has selected a non-zero TFC to be transmitted on the UL DCH). The E-TFC selection procedure may consider all E-TFCs leading to 2×SF2+2×SF4 E-DPDCH code configuration to be in blocked state for the primary uplink carrier for all E-DCH TTIs overlapping with an uplink DCH TTI for which the TFC selection procedure has selected a non-zero TFC for transmission.

The table 1 is an excerpt from 3GPP TS 25.213 v12.0.0 section 4.2.1 table 0 with possible extensions to enable a combination of DC-HSUPA and CS. A new "case X" that encodes a possibility to have both DPDCH and E-DPDCH on the primary carrier in addition to having E-DPDCH on the secondary one. It should be noted that there is also another "case Y" that would be needed if DC-HSUPA and CS is configured when a UE has also 8C-HSDPA in DL (8C=8 carrier) and/or 4×4 DL MIMO (MIMO=Multiple Input Multiple Output with 4 receive and 4 transmit antennas).

| | DPDCH | HS-DPCCH | E-DPDCH | E-DPCCH | S-E-DPDCH | S-E-DPCCH |
|---|---|---|---|---|---|---|
| Case 1 | 6 | 1 | — | — | — | — |
| Case 2 | 1 | 1 | 2 | 1 | — | — |
| Case 3 | — | 1 on the primary uplink frequency, 0 on any secondary uplink frequency | 4 per uplink frequency | 1 per uplink frequency | — | — |
| Case 4 | 1 | 2 | 2 | 1 | — | — |
| Case 5 | — | 2 on the primary uplink frequency, 0 on any secondary uplink frequency | 4 per uplink frequency | 1 per uplink frequency | — | — |
| Case 6 | — | 2 | 4 | 1 | 4 | 1 |
| Case X | 1 | 1 on the primary uplink frequency, 0 on any secondary uplink frequency | 2 on the primary frequency, 4 on the secondary frequency | 1 per uplink frequency | — | — |
| Case Y | 1 | 2 on the primary uplink frequency, 0 on any secondary uplink frequency | 2 on the primary frequency, 4 on the secondary frequency | 1 per uplink frequency | — | — |

Table 1 shows the maximum number of simultaneously configured uplink dedicated channels In addition, 3GPP TS 25.321 v12.0.0 may need a new functional rule in the uplink transport block size selection for the E-DCH channel, or E-DCH E-TFC selection, where the transport block size that can be selected for the primary carrier is limited to such that it will never lead to 2×SF2+2×SF4 code combination on L1 and thus avoid one E-DPDCH code from colliding with the DPDCH code. For example, when the UE is configured with uplink DCH, then all E-TFCs leading to 2×SF2+2×SF4 E-DPDCH code configuration are considered to be in a blocked state for the primary uplink carrier effectively reducing the maximum E-DPDCH code combination to 2×SF2 in those time instants.

It should be understood that each block of the flowchart of FIG. 4 and any combination thereof may be implemented by various means or their combinations, such as hardware, software, firmware, one or more processors and/or circuitry.

Figure 6:
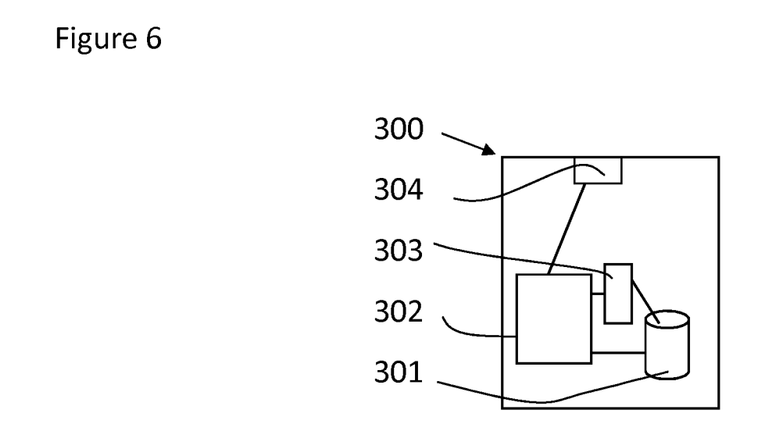
FIG. 6 shows a schematic diagram of an example control apparatus.

Embodiments described above by means of FIGS. 1 to 4 may be implemented on a control apparatus as shown in FIG. 6 or on a mobile device such as that of FIG. 2. FIG. 6 shows an example of a control apparatus (CA) for a communication system, for example to be coupled to and/or for controlling a station of an access system, such as a base station or (e) node B, or a server or host. In some embodiments, base stations comprise a separate apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions.

It should be understood that the apparatuses may include or be coupled to other units or modules etc., such as radio parts or radio heads, used in or for transmission and/or reception. Although the apparatuses have been described as one entity, different modules and memory may be implemented in one or more physical or logical entities.

Figure 5:
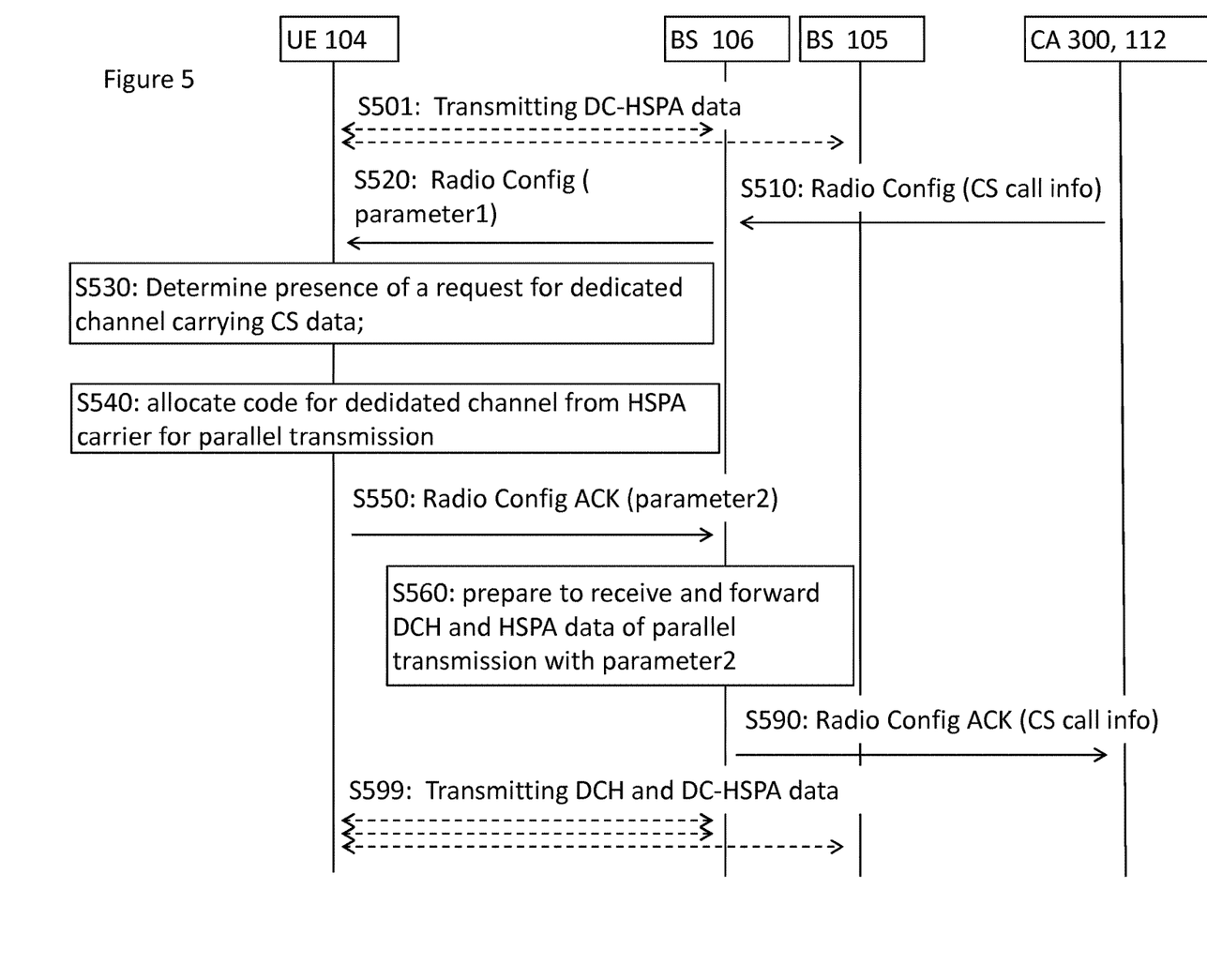
FIG. 5 shows a signaling diagram.

FIG. 5 shows a message flow which may be used in some embodiments. The RRC configuration implicitly performs the code allocation for the DCH and E-DCH, and in the dynamic option one code is allocated to both and the actual transmission needs define from packet to packet which of the two channels gets that one code. In a messaging flow such as that of FIG. 5, a UE selects the codes to be used according to the rules defined on physical layer for transmitting the DPDCH (DCH) and E-DPDCH(s) (E-DCH). There are two separate code channels (DPCCH and E-DPCCH) that carry the TFCI and E-TFCI bits that tell the Node B which TFC and E-TFC are in the air at this very moment, and the Node B uses the same rules the UE used to determine which code channels are used by the DPDCH and E-DPDCH(s).

As shown in FIG. 5 there is non-limiting steps including at step 5501 Transmitting DC-HSPA data between the UE 104 and the BS 106 and/or BS 105. As shown in step 5510 of FIG. 5 there is a Radio Config (CS call info) communicated between the CA 300, 112 and the 13S 106. As shown in step S520 of FIG. 5 there is a Radio Config (parameter 1) communicated between the BS 106 and the UE 104. As shown in step S530 of FIG. 5 there is determining presence of a request for dedicated channel carrying CS data. As shown in step 5540 of FIG. 5 there is allocating code for dedicated channel from HSPA carrier for parallel transmission. As shown in step 5550 there is communicated between the UE 104 and the BS 106 Radio Config ACK (parameter 2). As shown in step S560 of FIG. 5 there is at the BS 106 preparing to receive and forward DCH and HSPA data ofparallel transmission with parameter2. As shown in step S590 of FIG. 5 there is Radio Config Ack communicated between the BS 106 and/or BS 105 Radio Config ACK (CS call info). Then as shown in step 5599 there is communications between the UE 104 and the BS 106 and/or BS 105 that is Transmitting DCH and DC-HSPA data.

It is noted that whilst embodiments have been described in relation to WCDMA HSPA technology, similar principles can be applied to any other communication system or radio access technology. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments as described above by means of FIGS. 1 to 5 may be implemented by computer software executable by a data processor, at least one data processing unit or process of a device, such as a base station, e.g. eNB, or a UE, in, e.g., the processor entity, or by hardware, or by a combination of software and hardware. Computer software or program, also called program product, including software routines, applets and/or macros, may be stored in any apparatus-readable data storage medium or distribution medium and they include program instructions to perform particular tasks. An apparatus-readable data storage medium or distribution medium may be a non-transitory medium. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments described above in relation to FIGS. 1 to 5 may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
   determining, at a user equipment providing uplink packet switched data using at least a first high speed packet access carrier, the presence of a request for a dedicated channel carrying circuit switched data; and
   allocating at least one code from the first high speed packet access carrier for use by the dedicated channel, comprising the at least one code from the first high speed packet access carrier is mapped to the dedicated channel such that the dedicated channel carries the circuit switched data and operates on a single carrier, wherein the user equipment is providing uplink packet switched data using the first high speed packet access carrier while the dedicated channel carrying the circuit switched data is ongoing.

2. A method according to claim 1, wherein allocating a code from the first high speed access carrier comprises reducing the capacity of the carrier for uplink packet switched data from a full code set to a reduced code set.

3. A method according to claim 2, wherein the full code set is ×SF2+2×SF4.

4. A method according to claim 2 where the reduced code set is 2×SF2.

5. A method according to claim 1, wherein the user equipment is providing uplink packet switched data using the first high speed packet access carrier and a second high speed packet access carrier, and comprising:
   allocating at least one code from the first high speed packet access carrier for use by the dedicated channel, such that the user equipment is providing uplink packet switched data using the second high speed packet access carrier while the dedicated channel carrying the circuit switched data is ongoing.

6. A method according to claim 5, wherein the user equipment is providing uplink packet switched data using the second high speed access carrier at a capacity of the full code set while the dedicated channel carrying the circuit switched data is ongoing.

7. A method according to claim 5, wherein the first high speed access carrier is a primary carrier and the second high speed access carrier is a secondary carrier.

8. A method according to claim 1, wherein determining the presence of a request for a dedicated channel carrying circuit switched data comprises: at least one of receiving an incoming circuit switched call and initiating a circuit switched call and comprising:
   allocating the at least one code for use by the dedicated channel statically when the request is determined.

9. A method according to claim 1, wherein determining the presence of a request for a dedicated channel carrying circuit switched data comprises
   determining whether circuit switched data on the dedicated channel is present and, if so, allocating dynamically the at least one code for use by the dedicated channel.

10. A method according to claim 1, wherein the at least one code is allocated for the dedicated channel from a code tree associated with the user equipment.

11. A method according to claim 1, wherein the dedicated channel carrying circuit switched data is using single carrier frequency division multiple access.

12. A computer program product for a computer, comprising a non-transitory memory including software code portions executed by at least one processor to perform the method of claim 1 when said product is run on the computer.

13. A method comprising:
receiving, from a user equipment, uplink packet switched data using a first high speed packet access carrier while a dedicated channel carrying circuit switched data is ongoing, the dedicated channel using at least one code allocated from the first high speed packet access carrier and mapped to the dedicated channel such that the dedicated channel carries the circuit switched data and operates on a single carrier, wherein the uplink packet switched data is using the first high speed packet access carrier while the dedicated channel is ongoing.

14. A method according to claim 13, wherein the capacity of the first high speed access carrier for uplink packet switched data is reduced from a full code set to a reduced code set.

15. A method according to claim 14, wherein the full code set is 2×SF2+2×SF4.

16. A method according to claim 14 where the reduced code set is 2×SF2.

17. A method according to claim 13, wherein the user equipment is providing uplink packet switched data using at least a first high speed packet access carrier and a second high speed packet access carrier, and comprising: receiving uplink packet switched data using the second high speed packet access carrier while the dedicated channel for-carrying circuit switched data is ongoing.

18. A method according to claim 17, wherein the capacity of the second high speed access carrier is at a full code set while the dedicated channel carrying the circuit switched data is ongoing.

19. A method according to claim 17, wherein the first high speed access carrier is a primary carrier and the second high speed access carrier is a secondary carrier.

20. A method according to claim 13, wherein the at least one code for use by the dedicated channel is allocated statically.

21. A method according to claim 13, wherein the at least one code is allocated for use by the dedicated channel if circuit switched data on the dedicated channel is present.

22. A method according to claim 13, wherein the at least one code is allocated for use by the dedicated channel from a code tree associated with the user equipment.

23. A method according to claim 13, wherein the dedicated channel carrying circuit switched data is a dedicated physical data channel.

24. An apparatus comprising:
at least one processor and at least one memory including a computer program code, the at least one memory and the computer program code configured to, with the at least one processor, cause the apparatus at least to:
determine, at a user equipment providing uplink packet switched data using at least a first high speed packet access carrier, the presence of a request for a dedicated channel carrying circuit switched data; and
allocate at least one code from the first high speed packet access carrier for use by the dedicated channel, comprising the at least one code from the first high speed packet access carrier is mapped to the dedicated channel such that the dedicated channel carries the circuit switched data and operates on a single carrier, wherein the user equipment is providing uplink packet switched data using the first high speed packet access carrier while the dedicated channel is ongoing.

25. An apparatus comprising:
at least one processor and at least one memory including a computer program code, the at least one memory and the computer program code configured to, with the at least one processor, cause the apparatus at least to:
receive, from a user equipment, uplink packet switched data using a first high speed packet access carrier while a dedicated channel for carrying circuit switched data is ongoing, the dedicated channel using at least one code allocated from the first high speed packet access carrier and mapped to the dedicated channel such that the dedicated channel carries the circuit switched data and operates on a single carrier, wherein the uplink packet switched data is using the first high speed packet access carrier while the dedicated channel is ongoing.

* * * * *

UNITED STATES PATENT AND TRADEMARK OFFICE
CERTIFICATE OF CORRECTION

PATENT NO. : 10,819,476 B2
APPLICATION NO. : 15/752357
DATED : October 27, 2020
INVENTOR(S) : Alexander Sayenko and Karri Markus Ranta-Aho Page 1 of 1

It is certified that error appears in the above-identified patent and that said Letters Patent is hereby corrected as shown below:

In the Claims

In Claim 3:
Column 16, Line 30, "×SF2+2×SF4" should be deleted and --2×SF2+2×SF4-- should be inserted.

In Claim 17:
Column 17, Line 33, "channel for-carrying" should be deleted and --channel carrying-- should be inserted.

In Claim 25:
Column 18, Line 35, "channel for carrying" should be deleted and --channel carrying-- should be inserted.

Signed and Sealed this
Fifteenth Day of December, 2020

Andrei Iancu
*Director of the United States Patent and Trademark Office*